US012627543B2

(12) United States Patent
Zhang

(10) Patent No.: US 12,627,543 B2
(45) Date of Patent: May 12, 2026

(54) ADAPTIVE EQUALIZATION METHOD AND APPARATUS FOR PROBABILISTIC SHAPING SYSTEM, AND READABLE STORAGE MEDIUM

(71) Applicant: ZTE CORPORATION, Shenzhen (CN)

(72) Inventor: Liangjun Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 77 days.

(21) Appl. No.: 18/700,553

(22) PCT Filed: Oct. 9, 2022

(86) PCT No.: PCT/CN2022/124163
§ 371 (c)(1),
(2) Date: Apr. 11, 2024

(87) PCT Pub. No.: WO2023/061300
PCT Pub. Date: Apr. 20, 2023

(65) Prior Publication Data
US 2024/0414038 A1 Dec. 12, 2024

(30) Foreign Application Priority Data
Oct. 13, 2021 (CN) .......................... 202111191070.6

(51) Int. Cl.
*H04L 27/01* (2006.01)
*H04L 25/03* (2006.01)
*H04L 27/34* (2006.01)

(52) U.S. Cl.
CPC ........ *H04L 27/01* (2013.01); *H04L 25/03019* (2013.01); *H04L 27/3405* (2013.01)

(58) Field of Classification Search
CPC ................ H04L 27/01; H04L 27/3405; H04L 25/03019
(Continued)

(56) References Cited

U.S. PATENT DOCUMENTS

2003/0198288 A1 10/2003 Abdelilah et al.
2014/0079407 A1 3/2014 Dou et al.
(Continued)

FOREIGN PATENT DOCUMENTS

CN 102082749 A 6/2011
CN 103684600 A 3/2014
(Continued)

OTHER PUBLICATIONS

International Searching Authority. International Search Report and Written Opinion for PCT Application No. PCT/CN2022/124163 and English translation, mailed Dec. 21, 2022, pp. 1-11.
(Continued)

*Primary Examiner* — Kevin M Burd
(74) *Attorney, Agent, or Firm* — Vivacqua Crane, PLLC

(57) ABSTRACT

The present application discloses an adaptive equalization method and apparatus for a probabilistic shaping system, and a readable storage medium. The adaptive equalization method may include: determining a tap length of a filter, and setting an initial coefficient of an equalizer; performing butterfly filtering on two polarized input signals according to the coefficient of the equalizer to obtain two polarized output signals; determining an error signal according to the two polarized output signals, wherein the error signal is a sum of a first error which is a minimum value of differences between a target convergence radius and squares of modulus of the output signals, and a second error which is a difference between an average value of squares of modulus of a plurality of output signals and a target average power; and adjusting the coefficient of the equalizer according to the error signal.

20 Claims, 2 Drawing Sheets

(58) Field of Classification Search
USPC ........................................................ 375/232
See application file for complete search history.

(56) References Cited

U.S. PATENT DOCUMENTS

| | | | |
|---|---|---|---|
| 2014/0079408 A1 | 3/2014 | Yan et al. | |
| 2014/0328585 A1* | 11/2014 | Arikawa ............ | H04B 10/6162 |
| | | | 398/208 |
| 2021/0152403 A1 | 5/2021 | Sasaki et al. | |
| 2021/0194596 A1 | 6/2021 | Kim et al. | |

FOREIGN PATENT DOCUMENTS

| | | |
|---|---|---|
| CN | 107809281 A | 3/2018 |
| CN | 108111446 A | 6/2018 |
| EP | 2251993 A1 | 11/2010 |
| JP | 2014060708 A | 4/2014 |
| JP | 2021082945 A | 5/2021 |
| JP | 2021100240 A | 7/2021 |

OTHER PUBLICATIONS

Di Rosa, G., et al. "Likelihood-Based Selection Radius Directed Equalizer With Time-Multiplexed Pilot Symbols for Probabilistically Shaped QAM," IEEE Journal of Lightwave Technology, vol. 39, No. 19, Oct. 2021, pp. 6107-6119.
European Patent Office. Extended European Search Report for EP Application No. 22880239.3, mailed Dec. 20, 2024, pp. 1-6.
Japan Patent Office. Notice of Reasons for Refusal for JP Application No. 2024-521220 and English translation, mailed Feb. 25, 2025, pp. 1-6.

* cited by examiner 310 setting module 320 filtering module 330 error calculation module 340 adjustment module

ADAPTIVE EQUALIZATION METHOD AND APPARATUS FOR PROBABILISTIC SHAPING SYSTEM, AND READABLE STORAGE MEDIUM

CROSS-REFERENCE TO RELATED APPLICATION

This application is a national stage filing under 35 U.S.C. § 371 of international application number PCT/CN2022/124163, filed Oct. 9, 2022, which claims priority to Chinese patent application No. 202111191070.6 filed Oct. 13, 2021. The entire contents of these applications are incorporated herein by reference in their entirety.

TECHNICAL FIELD

The present disclosure relates to the field of communication technologies, and in particular, to an adaptive equalization method and apparatus for a probabilistic shaping system, and a readable storage medium.

BACKGROUND

With the development of big data, 4K video, virtual reality and the increasingly urgent demand of 5G bearer, optical transmission systems need to provide a higher transmission capacity. As early as 1948, Shannon, the founder of information theory, proved in his paper "A Mathematical Theory of Communication" that when the source distribution accords with the channel distribution, the channel has the maximum transmission capacity. Probability Shaping (PS) optical communication systems have been studied in recent years, which improve the transmission performance of the system by changing the probability distribution of the source to make it close to a Gaussian distribution.

Digital Signal Processing (DSP) technologies are usually used to compensate for the loss of devices and channels in optical communication systems, including dispersion compensation, adaptive equalization compensation, clock recovery, carrier phase recovery, etc. The introduction of probabilistic shaping leads to the failure of some conventional DSP algorithms. For example, in the case of a high degree of probabilistic shaping, the conventional Constant Module Algorithm (CMA) fails and cannot correctly compensate for the polarization crosstalk and polarization mode dispersion in the channels. As a result, the system cannot operate.

SUMMARY

The present disclosure provides an adaptive equalization method and apparatus for a probabilistic shaping system, and a readable storage medium.

In accordance with a first aspect of the present disclosure, an embodiment provides an adaptive equalization method for a probabilistic shaping system, which may include: determining a tap length of a filter and setting an initial coefficient of an equalizer; performing butterfly filtering on two polarized input signals according to the coefficient of the equalizer to obtain two polarized output signals; determining an error signal according to the two polarized output signals, where the error signal is a sum of a first error which is a minimum value of differences between a target convergence radius and squares of modulus of the output signals, and a second error which is a difference between an average value of squares of modulus of a plurality of output signals and a target average power; and adjusting the coefficient of the equalizer according to the error signal.

In accordance with a second aspect of the present disclosure, an embodiment provides an adaptive equalization apparatus for a probabilistic shaping system, which may include: a setting module, configured to determine a tap length of a filter and set an initial coefficient of an equalizer; a filtering module, configured to perform butterfly filtering on two polarized input signals according to the coefficient of the equalizer to obtain two polarized output signals; an error calculation module, configured to determine an error signal according to the two polarized output signals, where the error signal is a sum of a first error which is a minimum value of differences between a target convergence radius and squares of modulus of the output signals, and a second error which is a difference between an average value of squares of modulus of a plurality of output signals and a target average power; and an adjustment module, configured to adjust the coefficient of the equalizer according to the error signal.

In accordance with a third aspect of the present disclosure, an embodiment provides a DSP chip, which may include the adaptive equalization apparatus in the embodiment of the second aspect of the present disclosure.

In accordance with a fourth aspect of the present disclosure, an embodiment provides a computer-readable storage medium, storing a computer-executable instruction which, when executed by a computer, causes the computer to implement the adaptive equalization method in the embodiment of the first aspect of the present disclosure.

Additional features and advantages of the present disclosure will be set forth in the subsequent description, and it will in part be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and are not intended to limit the technical schemes of the present disclosure.

The present disclosure is further described below with reference to the accompanying drawings and embodiments.

DETAILED DESCRIPTION

Figure 1:
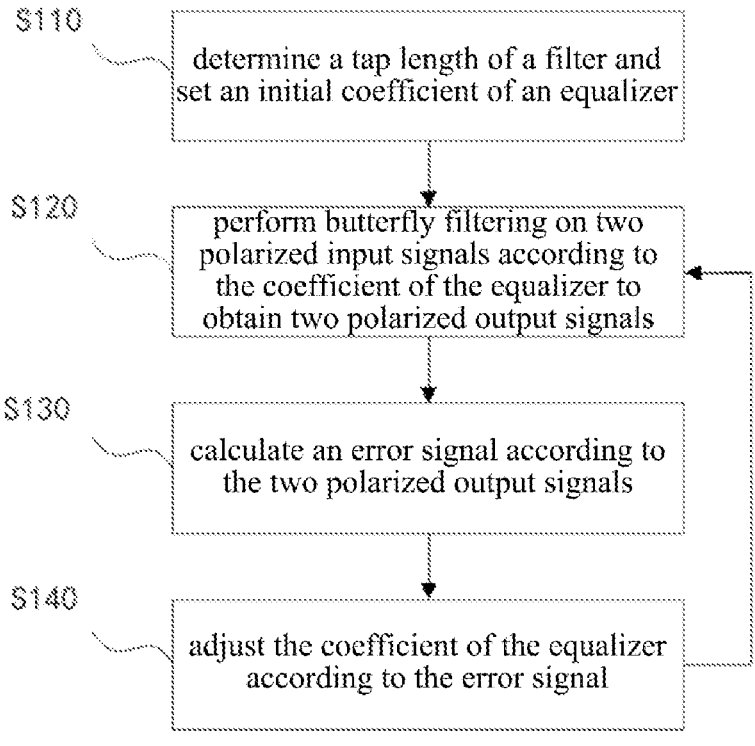
FIG. 1 is a flowchart of an adaptive equalization method for a probabilistic shaping system according to an embodiment of the present disclosure.

This section will give a detailed description of embodiments of the present disclosure. Preferred embodiments of the present disclosure are shown in the accompanying drawings. The accompanying drawings supplement the description of the text part of the description in a graphic way, such that those having ordinary skills in the art can intuitively and vividly understand each technical feature and the overall technical scheme of the present disclosure, but the accompanying drawings are not intended to be construed as limiting the scope of protection of the present disclosure.

In the description of the present disclosure, the terms such as "first", "second" and the like used herein are merely used for distinguishing technical features, and are not intended to indicate or imply relative importance, or implicitly indicate the number of the specific technical features, or implicitly indicate a precedence order of the specific technical features.

In the description of the present disclosure, unless otherwise explicitly defined, the terms such as "configure", "install/mount" and "connect" should be understood in a broad sense, and those having ordinary skills in the art can reasonably determine the specific meanings of the above terms in the present disclosure based on the specific contents of the technical scheme.

With the development of big data, 4K video, virtual reality and the increasingly urgent demand of 5G bearer, optical transmission systems need to provide a higher transmission capacity. As early as 1948, Shannon, the founder of information theory, proved in his paper "A Mathematical Theory of Communication" that when the source distribution accords with the channel distribution, the channel has the maximum transmission capacity. Probability Shaping (PS) optical communication systems have been studied in recent years, which improve the transmission performance of the system by changing the probability distribution of the source to make it close to a Gaussian distribution.

DSP technologies are usually used to compensate for the loss of devices and channels in optical communication systems, including dispersion compensation, adaptive equalization compensation, clock recovery, carrier phase recovery, etc. The introduction of probabilistic shaping leads to the failure of some conventional DSP algorithms. For example, in the case of a high degree of probabilistic shaping, the CMA fails and cannot correctly compensate for the polarization crosstalk and polarization mode dispersion in the channels. As a result, the system cannot operate. Therefore, it is necessary to propose an improved adaptive equalization algorithm for the probabilistic shaping mode.

Embodiments of the present disclosure provide an adaptive equalization method and apparatus for a probabilistic shaping system, and a readable storage medium, to effectively compensate for the channel loss and reduce the bit error rate.

The embodiments of the present disclosure will be further described in detail below with reference to the accompanying drawings.

Figure 2:
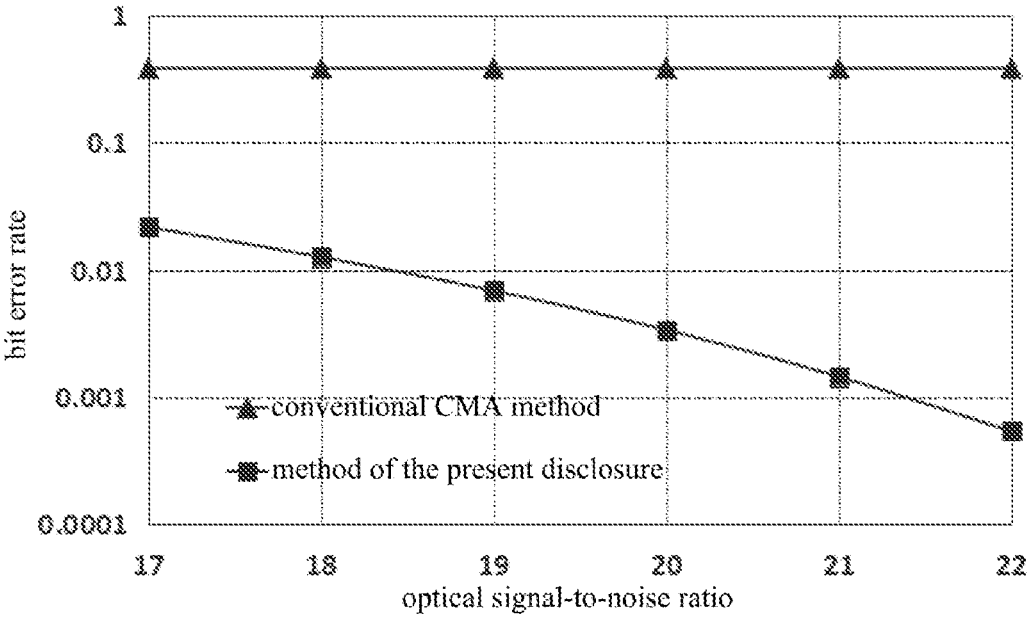
FIG. 2 is a schematic diagram showing comparison between simulation results of an adaptive equalization method for a probabilistic shaping system according to an embodiment of the present disclosure and a conventional CMA adaptive equalization method.

Referring to FIG. 1 or FIG. 2, in accordance with a first aspect of the present disclosure, an embodiment provides an adaptive equalization method for a probabilistic shaping system, including the following steps S110 to S140.

At S110, a tap length of a filter is determined and an initial coefficient of an equalizer is set.

At S120, butterfly filtering is performed on two polarized input signals according to the coefficient of the equalizer to obtain two polarized output signals.

At S130, an error signal is determined according to the two polarized output signals. For example, the error signal is a sum of a first error which is a minimum value of differences between a target convergence radius and squares of modulus of the output signals, and a second error which is a difference between an average value of squares of modulus of a plurality of output signals and a target average power.

At S140, the coefficient of the equalizer is adjusted according to the error signal.

In S120 of the adaptive equalization method, the two polarized output signals are obtained according to the following formula:

$$x_{out} = h_{xx}x_{in} + h_{xy}y_{in}$$

$$y_{out} = h_{yx}x_{in} + h_{yy}y_{in}$$

where $h_{xx}$, $h_{xy}$, $h_{yx}$, and $h_{yy}$ represent the coefficients of the equalizer, respectively; $x_{in}$ and $y_{in}$ represent the two polarized input signals, respectively; and $x_{out}$ and $y_{out}$ represent the two polarized output signals, respectively.

In S130 of the adaptive equalization method, the error signal is obtained according to the following formula:

$$\varepsilon_x = \min\left(R_1 - |x_{out}|^2, R_2 - |x_{out}|^2, \ldots, R_k - |x_{out}|^2\right) + \left(p - \frac{\sum|x_{out}|^2}{n}\right)$$

$$\varepsilon_y = \min\left(R_1 - |y_{out}|^2, R_2 - |y_{out}|^2, \ldots, R_k - |y_{out}|^2\right) + \left(p - \frac{\sum|y_{out}|^2}{n}\right)$$

where $R_1$, $R_2$, . . . , $R_k$ represent squares of k modulus of a probabilistic shaping QAM signal, respectively, p represents the target average power, n represents a number of samples used, e.g., a number of samples used for calculating an average signal power, and min represents an operation of calculating a minimum value; and $\varepsilon_x$ and $\varepsilon_y$ are error signals of the two polarized output signals, respectively. It should be noted that the target average power p is an average power of the output signals when it converges correctly.

In S140 of the adaptive equalization method, the coefficient of the equalizer according to the error signal is adjusted according to the following formula:

$$h_{xx} = h_{xx} + \mu * \varepsilon_x * conj(x_{in})$$

$$h_{xy} = h_{xy} + \mu * \varepsilon_x * conj(y_{in})$$

$$h_{yx} = h_{yx} + \mu * \varepsilon_y * conj(x_{in})$$

$$h_{yy} = h_{yy} + \mu * \varepsilon_y * conj(y_{in})$$

where μ represents a step size for adjusting the coefficient of the equalizer, and conj represents a conjugation operation.

It should be noted that after the coefficient of the equalizer is adjusted, the process needs to return to S120 to filter the input signals.

In the adaptive equalization method, a modulation format used by the probabilistic shaping system includes a PS-16QAM format, a PS-64QAM format, or a PS-QAM format with an order higher than 64.

In the adaptive equalization method for a probabilistic shaping system according to the embodiments of the present disclosure, the second error, i.e., the difference between the average value of the squares of the modulus of the plurality of output signals and the target average power, is introduced for the calculation of the error signal, to adjust the coefficient of the equalizer. The method of the present disclosure is different from a conventional CMA algorithm mainly in the improvement of the error calculation. Compared with the conventional CMA adaptive equalization algorithm, the method of the present disclosure can correctly compensate for the polarization crosstalk, polarization mode dispersion, and other losses in the probabilistic shaping system, thereby effectively compensating for the channel loss and reducing the bit error rate.

The adaptive equalization method provided in the present disclosure will be further described below in conjunction with the embodiments.

Assuming that the modulation format used by the probabilistic shaping system is the PS-16QAM format, the probability distribution of 16 constellation points is as shown in the following table.

| 0.0062 | 0.0331 | 0.0331 | 0.0062 |
|--------|--------|--------|--------|
| 0.0331 | 0.1776 | 0.1776 | 0.0331 |
| 0.0331 | 0.1776 | 0.1776 | 0.0331 |
| 0.0062 | 0.0331 | 0.0331 | 0.0062 |

The tap length of the filter is set to 11, and the initial coefficient of the adaptive equalizer is set as follows:

$$h_{xx} = [0, 0, 0, 0, 0, 1, 0, 0, 0, 0, 0]$$

$$h_{xy} = [0, 0, 0, 0, 0, 0, 0, 0, 0, 0, 0]$$

$$h_{yx} = [0, 0, 0, 0, 0, 0, 0, 0, 0, 0, 0]$$

$$h_{yy} = [0, 0, 0, 0, 0, 1, 0, 0, 0, 0, 0].$$

Butterfly filtering is performed on the input signals according to S120 to obtain output signals, and then the errors of the output signals are calculated as follows:

$$\varepsilon_x = \min\left(R_1 - |x_{out}|^2, \ R_2 - |x_{out}|^2, \ \dots \ , R_3 - |x_{out}|^2\right) + \left(p - \frac{\Sigma |x_{out}|^2}{n}\right)$$

$$\varepsilon_y =$$

$$\min\left(R_1 - |y_{out}|^2, \ R_2 - |y_{out}|^2, \ \dots \ , R_3 - |y_{out}|^2\right) + \left(p - \frac{\Sigma |y_{out}|^2}{n}\right)$$

where $R_1=2$, $R_2=10$, $R_3=18$, p=4.52.

The coefficient of the equalizer is adjusted according to the S140, and the step size $\mu$ is set to 0.0001.

FIG. 2 is a schematic diagram showing comparison between simulation results of an adaptive equalization method for a probabilistic shaping system according to an embodiment of the present disclosure and a conventional CMA adaptive equalization method. It can be seen that the bit error rate of the conventional CMA adaptive equalization method is always very high, and the adaptive equalization method provided in the present disclosure can effectively compensate for the channel loss and reduce the bit error rate.

Figure 3:
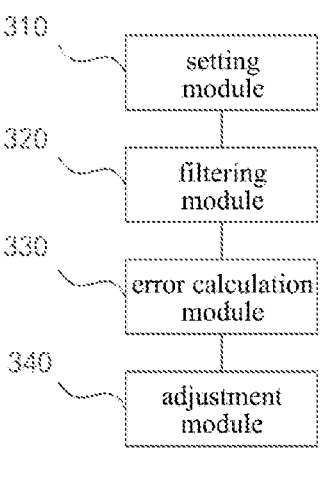
FIG. 3 is a schematic structural diagram of an adaptive equalization apparatus for a probabilistic shaping system according to an embodiment of the present disclosure.

Referring to FIG. 3, in accordance with a second aspect of the present disclosure, an embodiment provides an adaptive equalization apparatus for a probabilistic shaping system, including the following modules.

A setting module 310 is configured to determine a tap length of a filter and set an initial coefficient of an equalizer.

A filtering module 320 is configured to perform butterfly filtering on two polarized input signals according to the coefficient of the equalizer to obtain two polarized output signals.

An error calculation module 330 is configured to determine an error signal according to the two polarized output signals. For example, the error signal is a sum of a first error which is a minimum value of differences between a target convergence radius and squares of modulus of the output signals, and a second error which is a difference between an average value of squares of modulus of a plurality of output signals and a target average power.

An adjustment module 340 is configured to adjust the coefficient of the equalizer according to the error signal.

In the filtering module 320 of the adaptive equalization apparatus, the two polarized output signals are obtained according to the following formula:

$$x_{out} = h_{xx}x_{in} + h_{xy}y_{in}$$

$$y_{out} = h_{yx}x_{in} + h_{yy}y_{in}$$

where $h_{xx}$, $h_{xy}$, $h_{yx}$, and $h_{yy}$ represent the coefficients of the equalizer, respectively; $x_{in}$ and $y_{in}$ represent the two polarized input signals, respectively; and $x_{out}$ and $y_{out}$ represent the two polarized output signals, respectively.

In the error calculation module 330 of the adaptive equalization apparatus, the error signal is determined according to the following formula:

$$\varepsilon_x = \min\left(R_1 - |x_{out}|^2, \ R_2 - |x_{out}|^2, \ \dots \ , R_k - |x_{out}|^2\right) + \left(p - \frac{\Sigma |x_{out}|^2}{n}\right)$$

$$\varepsilon_y =$$

$$\min\left(R_1 - |y_{out}|^2, \ R_2 - |y_{out}|^2, \ \dots \ , R_k - |y_{out}|^2\right) + \left(p - \frac{\Sigma |y_{out}|^2}{n}\right)$$

where $R_1$, $R_2$, $\dots$ , $R_k$ represent squares of k modulus of a probabilistic shaping QAM signal, respectively, p represents the target average power, n represents a number of samples used, min represents an operation of calculating a minimum value; and $\varepsilon_x$ and $\varepsilon_y$ are error signals of the two polarized output signals, respectively.

In the adjustment module 340 of the adaptive equalization apparatus, the coefficient of the equalizer is adjusted according to the error signal using the following formula:

$$h_{xx} = h_{xx} + \mu * \varepsilon_x * conj(x_{in})$$

$$h_{xy} = h_{xy} + \mu * \varepsilon_x * conj(y_{in})$$

$$h_{yx} = h_{yx} + \mu * \varepsilon_y * conj(x_{in})$$

$$h_{yy} = h_{yy} + \mu * \varepsilon_y * conj(y_{in})$$

where $\mu$ represents a step size for adjusting the coefficient of the equalizer, and conj represents a conjugation operation.

In the adaptive equalization apparatus, a modulation format used by the probabilistic shaping system includes a PS-16QAM format, a PS-64QAM format, or a PS-QAM format with an order higher than 64.

In the adaptive equalization apparatus for a probabilistic shaping system according to the embodiments of the present disclosure, the second error, i.e., the difference between the average value of the squares of the modulus of the plurality of output signals and the target average power, is introduced for the calculation of the error signal, to adjust the coefficient of the equalizer. Compared with the conventional CMA adaptive equalization algorithm, the apparatus of the present disclosure can correctly compensate for the polarization crosstalk, polarization mode dispersion, and other losses in the probabilistic shaping system, thereby effectively compensating for the channel loss and reducing the bit error rate.

In addition, in accordance with a third aspect of the present disclosure, an embodiment provides a DSP chip, including the adaptive equalization apparatus in the embodiment of the second aspect.

In the DSP chip according to the embodiments of the present disclosure, the second error, i.e., the difference between the average value of the squares of the modulus of the plurality of output signals and the target average power, is introduced for the calculation of the error signal, to adjust the coefficient of the equalizer. Compared with the conventional CMA adaptive equalization algorithm, the schemes of the present disclosure can correctly compensate for the polarization crosstalk, polarization mode dispersion, and other losses in the probabilistic shaping system, thereby effectively compensating for the channel loss and reducing the bit error rate.

In addition, in accordance with a fourth aspect of the present disclosure, an embodiment provides a computer-readable storage medium, storing a computer-executable instruction which, when executed by a computer, causes the computer to implement the adaptive equalization method in the embodiment of the first aspect of the present disclosure, for example, to implement the foregoing steps S110 to S140 of the method in FIG. 1.

In the computer-readable storage medium according to the embodiments of the present disclosure, the second error, i.e., the difference between the average value of the squares of the modulus of the plurality of output signals and the target average power, is introduced for the calculation of the error signal, to adjust the coefficient of the equalizer. Compared with the conventional CMA adaptive equalization algorithm, the schemes of the present disclosure can correctly compensate for the polarization crosstalk, polarization mode dispersion, and other losses in the probabilistic shaping system, thereby effectively compensating for the channel loss and reducing the bit error rate.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium or non-transitory medium and a communication medium or transitory medium. As is known to those having ordinary skills in the art, the term "computer storage medium" includes volatile and nonvolatile, removable and non-removable media implemented in any method or technology for storage of information such as computer readable instructions, data structures, program modules, or other data. The computer storage medium includes, but not limited to, Random Access Memory (RAM), Read-Only Memory (ROM), Electrically Erasable Programmable Read-Only Memory (EEPROM), flash memory or other memory technology, Compact Disc Read-Only Memory (CD-ROM), Digital Versatile Disc (DVD) or other optical storage, cassette, magnetic tape, magnetic disk storage or other magnetic storage device, or any other medium which can be used to store the desired information and which can be accessed by a computer. In addition, as well known to those having ordinary skills in the art, the communication medium typically includes computer-readable instructions, data structures, program modules, or other data in a modulated data signal such as a carrier or other transport mechanism, and can include any information delivery medium.

The embodiments of the present disclosure have been described in detail above with reference to the accompanying drawings, but the present disclosure is not limited to the above embodiments, and various changes may be made within the knowledge of those having ordinary skills in the art without departing from the protection scope of the present disclosure.

What is claimed is:

1. An adaptive equalization method for a probabilistic shaping system, comprising:
   determining a tap length of a filter, and setting an initial coefficient of an equalizer;
   performing butterfly filtering on two polarized input signals according to the coefficient of the equalizer to obtain two polarized output signals;
   determining an error signal according to the two polarized output signals, wherein the error signal is a sum of a first error which is a minimum value of differences between a target convergence radius and squares of modulus of the output signals, and a second error which is a difference between an average value of squares of modulus of a plurality of output signals and a target average power; and
   adjusting the coefficient of the equalizer according to the error signal.

2. The adaptive equalization method of claim 1, wherein the two polarized output signals are:

$$x_{out} = h_{xx}x_{in} + h_{xy}y_{in}$$

$$y_{out} = h_{yx}x_{in} + h_{yy}y_{in}$$

wherein $h_{xx}$, $h_{xy}$, $h_{yx}$, and $h_{yy}$ represent the coefficients of the equalizer, respectively;
$x_{in}$ and $y_{in}$ represent the two polarized input signals, respectively; and
$x_{out}$ and $y_{out}$ represent the two polarized output signals, respectively.

3. The adaptive equalization method of claim 2, wherein the error signal is determined according to the following formula:

$$\varepsilon_x = \min\left(R_1 - |x_{out}|^2, \ R_2 - |x_{out}|^2, \ \dots, \ R_k - |x_{out}|^2\right) + \left(p - \frac{\Sigma |x_{out}|^2}{n}\right)$$

$$\varepsilon_y =$$

$$\min\left(R_1 - |y_{out}|^2, \ R_2 - |y_{out}|^2, \ \dots, \ R_k - |y_{out}|^2\right) + \left(p - \frac{\Sigma |y_{out}|^2}{n}\right)$$

wherein $R_1, R_2, \ldots, R_k$ represent the target convergence radii, respectively, p represents the target average power, n represents a number of samples used, and min represents an operation of calculating a minimum value; and $\varepsilon_x$ and $\varepsilon_y$ are error signals of the two polarized output signals.

4. The adaptive equalization method of claim 3, wherein the coefficient of the equalizer according to the error signal is adjusted according to the following formula:

$$h_{xx} = h_{xx} + \mu * \varepsilon_x * conj(x_{in})$$

$$h_{xy} = h_{xy} + \mu * \varepsilon_x * conj(y_{in})$$

$$h_{yx} = h_{yx} + \mu * \varepsilon_y * conj(x_{in})$$

$$h_{yy} = h_{yy} + \mu * \varepsilon_y * conj(y_{in})$$

wherein $\mu$ represents a step size for adjusting the coefficient of the equalizer, and conj represents a conjugation operation.

5. The method of claim 1, wherein a modulation format used by the probabilistic shaping system comprises a PS-16QAM format, a PS-64QAM format, or a PS-QAM format with an order higher than 64.

6. An adaptive equalization apparatus for a probabilistic shaping system, comprising:

a processor; and a memory configured to store a computer program which, when executed by the processor, causes the processor to perform an adaptive equalization apparatus for a probabilistic shaping system method comprising:

determining a tap length of a filter, and setting an initial coefficient of an equalizer;

performing butterfly filtering on two polarized input signals according to the coefficient of the equalizer to obtain two polarized output signals;

determining an error signal according to the two polarized output signals, wherein the error signal is a sum of a first error which is a minimum value of differences between a target convergence radius and squares of modulus of the output signals, and a second error which is a difference between an average value of squares of modulus of a plurality of output signals and a target average power; and adjusting the coefficient of the equalizer according to the error signal.

7. The adaptive equalization apparatus of claim 6, wherein the two polarized output signals are:

$$x_{out} = h_{xx}x_{in} + h_{xy}y_{in}$$

$$y_{out} = h_{yx}x_{in} + h_{yy}y_{in}$$

wherein $h_{xx}$, $h_{xy}$, $h_{yx}$, and $h_{yy}$ represent the coefficients of the equalizer, respectively;

$x_{in}$ and $y_{in}$ represent the two polarized input signals, respectively; and $x_{out}$ and $y_{out}$ represent the two polarized output signals, respectively.

8. The adaptive equalization apparatus of claim 7, wherein the error signal is determined according to the following formula:

$$\varepsilon_x = \min\left(R_1 - |x_{out}|^2, \ R_2 - |x_{out}|^2, \ \ldots, \ R_k - |x_{out}|^2\right) + \left(p - \frac{\Sigma |x_{out}|^2}{n}\right)$$

$$\varepsilon_y =$$

$$\min\left(R_1 - |y_{out}|^2, \ R_2 - |y_{out}|^2, \ \ldots, \ R_k - |y_{out}|^2\right) + \left(p - \frac{\Sigma |y_{out}|^2}{n}\right)$$

wherein $R_1, R_2, \ldots, R_k$ represent the target convergence radii, respectively, p represents the target average power, n represents a number of samples used, and min represents an operation of calculating a minimum value; and $\varepsilon_x$ and $\varepsilon_y$ are error signals of the two polarized output signals.

9. The adaptive equalization apparatus of claim 8, wherein the coefficient of the equalizer according to the error signal is adjusted according to the following formula:

$$h_{xx} = h_{xx} + \mu * \varepsilon_x * conj(x_{in})$$

$$h_{xy} = h_{xy} + \mu * \varepsilon_x * conj(y_{in})$$

$$h_{yx} = h_{yx} + \mu * \varepsilon_y * conj(x_{in})$$

$$h_{yy} = h_{yy} + \mu * \varepsilon_y * conj(y_{in})$$

wherein $\mu$ represents a step size for adjusting the coefficient of the equalizer, and conj represents a conjugation operation.

10. The adaptive equalization apparatus of claim 6, wherein a modulation format used by the probabilistic shaping system comprises a PS-16QAM format, a PS-64QAM format, or a PS-QAM format with an order higher than 64.

11. A Data Signal Processing (DSP) chip, comprising the adaptive equalization apparatus of claim 6.

12. The chip of claim 11, wherein the two polarized output signals are:

$$x_{out} = h_{xx}x_{in} + h_{xy}y_{in}$$

$$y_{out} = h_{yx}x_{in} + h_{yy}y_{in}$$

wherein $h_{xx}$, $h_{xy}$, $h_{yx}$, and $h_{yy}$ represent the coefficients of the equalizer, respectively;

$x_{in}$ and $y_{in}$ represent the two polarized input signals, respectively; and $x_{out}$ and $y_{out}$ represent the two polarized output signals, respectively.

13. The chip of claim 12, wherein the error signal is determined according to the following formula:

$$\varepsilon_x = \min\!\left(R_1 - |x_{out}|^2,\ R_2 - |x_{out}|^2,\ \ldots,\ R_k - |x_{out}|^2\right) + \left(p - \frac{\Sigma |x_{out}|^2}{n}\right) \quad 5$$

$$\varepsilon_y =$$

$$\min\!\left(R_1 - |y_{out}|^2,\ R_2 - |y_{out}|^2,\ \ldots,\ R_k - |y_{out}|^2\right) + \left(p - \frac{\Sigma |y_{out}|^2}{n}\right) \quad 10$$

wherein $R_1, R_2, \ldots, R_k$ represent the target convergence radii, respectively, p represents the target average power, n represents a number of samples used, and min represents an operation of calculating a minimum value; and $\varepsilon_x$ and $\varepsilon_y$ are error signals of the two polarized output signals.

14. The chip of claim 13, wherein the coefficient of the equalizer according to the error signal is adjusted according to the following formula:

$$h_{xx} = h_{xx} + \mu * \varepsilon_x * conj(x_{in}) \quad 25$$

$$h_{xy} = h_{xy} + \mu * \varepsilon_x * conj(y_{in})$$

$$h_{yx} = h_{yx} + \mu * \varepsilon_y * conj(x_{in})$$

$$h_{yy} = h_{yy} + \mu * \varepsilon_y * conj(y_{in}) \quad 30$$

wherein $\mu$ represents a step size for adjusting the coefficient of the equalizer, and conj represents a conjugation operation.

15. The chip of claim 11, wherein a modulation format used by the probabilistic shaping system comprises a PS-16QAM format, a PS-64QAM format, or a PS-QAM format with an order higher than 64.

16. A non-transitory computer-readable storage medium, storing a computer-executable instruction which, when executed by a computer, causes the computer to perform an adaptive equalization method comprising:

determining a tap length of a filter, and setting an initial coefficient of an equalizer;

performing butterfly filtering on two polarized input signals according to the coefficient of the equalizer to obtain two polarized output signals;

determining an error signal according to the two polarized output signals, wherein the error signal is a sum of a first error which is a minimum value of differences between a target convergence radius and squares of modulus of the output signals, and a second error which is a difference between an average value of squares of modulus of a plurality of output signals and a target average power; and adjusting the coefficient of the equalizer according to the error signal.

17. The non-transitory computer-readable storage medium of claim 16, wherein the two polarized output signals are:

$$x_{out} = h_{xx}x_{in} + h_{xy}y_{in}$$

$$y_{out} = h_{yx}x_{in} + h_{yy}y_{in}$$

wherein $h_{xx}$, $h_{xy}$, $h_{yx}$, and $h_{yy}$ represent the coefficients of the equalizer, respectively;

$x_{in}$ and $y_{in}$ represent the two polarized input signals, respectively; and $x_{out}$ and $y_{out}$ represent the two polarized output signals, respectively.

18. The non-transitory computer-readable storage medium of claim 17, wherein the error signal is determined according to the following formula:

$$\varepsilon_x = \min\!\left(R_1 - |x_{out}|^2,\ R_2 - |x_{out}|^2,\ \ldots,\ R_k - |x_{out}|^2\right) + \left(p - \frac{\Sigma |x_{out}|^2}{n}\right)$$

$$\varepsilon_y =$$

$$\min\!\left(R_1 - |y_{out}|^2,\ R_2 - |y_{out}|^2,\ \ldots,\ R_k - |y_{out}|^2\right) + \left(p - \frac{\Sigma |y_{out}|^2}{n}\right)$$

wherein $R_1, R_2, \ldots, R_k$ represent the target convergence radii, respectively, p represents the target average power, n represents a number of samples used, and min represents an operation of calculating a minimum value; and $\varepsilon_x$ and $\varepsilon_y$ are error signals of the two polarized output signals.

19. The non-transitory computer-readable storage medium of claim 18, wherein the coefficient of the equalizer according to the error signal is adjusted according to the following formula:

$$h_{xx} = h_{xx} + \mu * \varepsilon_x * conj(x_{in})$$

$$h_{xy} = h_{xy} + \mu * \varepsilon_x * conj(y_{in})$$

$$h_{yx} = h_{yx} + \mu * \varepsilon_y * conj(x_{in})$$

$$h_{yy} = h_{yy} + \mu * \varepsilon_y * conj(y_{in})$$

wherein $\mu$ represents a step size for adjusting the coefficient of the equalizer, and conj represents a conjugation operation.

20. The non-transitory computer-readable storage medium of claim 16, wherein a modulation format used by the probabilistic shaping system comprises a PS-16QAM format, a PS-64QAM format, or a PS-QAM format with an order higher than 64.

\* \* \* \* \*